(12) United States Patent
Ding

(10) Patent No.: US 8,899,467 B1
(45) Date of Patent: Dec. 2, 2014

(54) ULTRASONICALLY-ASSISTED THERMAL STIR WELDING SYSTEM

(75) Inventor: R. Jeffrey Ding, Athens, AL (US)

(73) Assignee: The United States of America as Represented by the Administrator of the National Aeronautics and Space Administration, Washington, DC (US)

( * ) Notice: Subject to any disclaimer, the term of this patent is extended or adjusted under 35 U.S.C. 154(b) by 579 days.

(21) Appl. No.: 13/242,734

(22) Filed: Sep. 23, 2011

(51) Int. Cl.
B23K 20/12 (2006.01)

(52) U.S. Cl.
USPC ............. 228/2.1; 228/1.1; 219/602; 219/603; 219/617

(58) Field of Classification Search
CPC ............ H05B 6/02; H05B 6/10; B23K 13/01; B23K 20/12; B23K 37/00; B23K 31/02; B23K 20/122–20/1265; B29C 65/00; B29C 65/08
USPC ........ 219/600, 602, 603, 617; 228/112.1, 2.1, 228/44.5, 49.3, 44.3, 2.3, 114.5, 110.1, 1.1; 156/73.1
See application file for complete search history.

(56) References Cited

U.S. PATENT DOCUMENTS

| | | | |
|---|---|---|---|
| 5,460,317 A * | 10/1995 | Thomas et al. ............ 228/112.1 |
| 6,029,487 A | 2/2000 | Genin et al. |
| 6,554,175 B1 * | 4/2003 | Thompson ................. 228/112.1 |
| 6,742,696 B2 * | 6/2004 | Thompson .................... 228/103 |
| 6,866,181 B2 * | 3/2005 | Aota et al. .................. 228/112.1 |
| 7,121,447 B2 | 10/2006 | Mosca et al. |
| 7,341,176 B2 * | 3/2008 | Lundstrom et al. ........... 228/138 |
| 7,832,613 B2 | 11/2010 | Hanlon et al. |
| 2002/0166617 A1 * | 11/2002 | Molander et al. ............ 156/73.1 |
| 2003/0218052 A2 * | 11/2003 | Litwinski ................... 228/112.1 |
| 2004/0079787 A1 * | 4/2004 | Okamoto et al. .......... 228/112.1 |
| 2006/0151570 A1 | 7/2006 | Shinkawa et al. |
| 2006/0169747 A1 * | 8/2006 | Tolle et al. ................. 228/112.1 |
| 2007/0272723 A1 | 11/2007 | Kimura et al. |
| 2009/0250144 A1 * | 10/2009 | Kumagai et al. .............. 148/535 |
| 2010/0015466 A1 | 1/2010 | Yoshioka |

\* cited by examiner

*Primary Examiner* — Dana Ross
*Assistant Examiner* — Michael Laflame, Jr.
(74) *Attorney, Agent, or Firm* — Peter J. Van Bergen; James J. McGroary

(57) ABSTRACT

A welding head assembly has a work piece disposed between its containment plates' opposing surfaces with the work piece being maintained in a plastic state thereof at least in a vicinity of the welding head assembly's stir rod as the rod is rotated about its longitudinal axis. The welding head assembly and the work piece experience relative movement therebetween in a direction perpendicular to the rod's longitudinal axis as the work piece is subjected to a compressive force applied by the containment plates. A first source coupled to the first containment plate applies a first ultrasonic wave thereto such that the first ultrasonic wave propagates parallel to the direction of relative movement. A second source coupled to the second containment plate applies a second ultrasonic wave thereto such that the second ultrasonic wave propagates parallel to the direction of relative movement.

20 Claims, 2 Drawing Sheets

ULTRASONICALLY-ASSISTED THERMAL STIR WELDING SYSTEM

ORIGIN OF THE INVENTION

Figure 1:
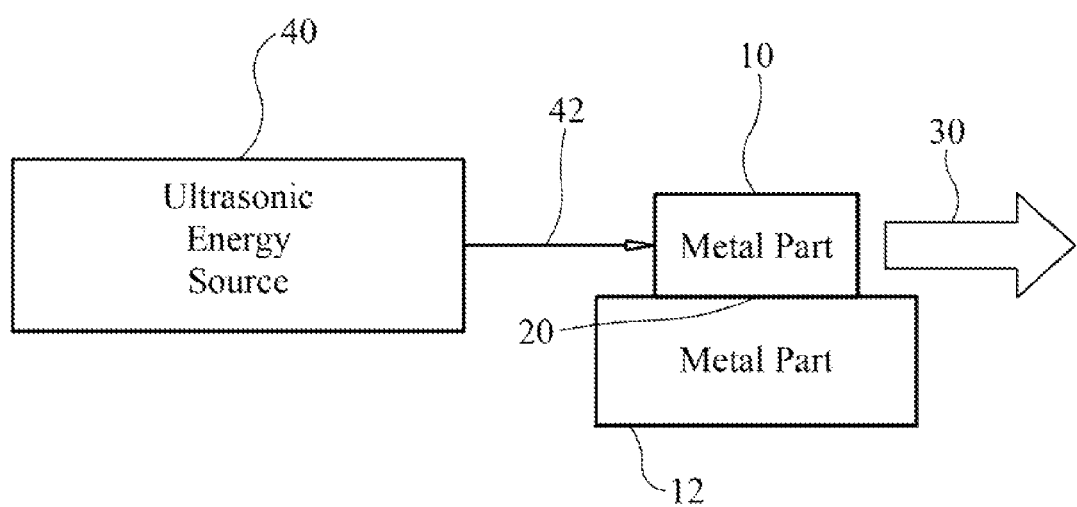

The invention was made by an employee of the United States Government and may be manufactured and used by or for the Government for governmental purposes without the payment of any royalties.

BACKGROUND OF THE INVENTION

1. Field of the Invention

This invention relates to sir welding systems. More specifically, the invention is a thermal stir welding system employing ultrasonic energy to assist in the welding process.

2. Description of the Related Art

Stir welding is a form of welding that utilizes a small stir pin to mix abutting or faying surfaces of two pieces of material (e.g., metal materials) to thereby form a joint between the two pieces of material. There are several types of stir welding systems/processes. For example, thermal stir welding (TSW) is a solid-state welding process capable of joining metallic alloys without melting. In this process, weld work pieces to be joined are heated and drawn by heavy forces between two containment plates applying compressive forces to the work pieces. The TSW stir pin is located between the containment plates and is rotated to create a join between the weld work pieces as they are drawn through the containment plates. The TSW process can be improved by reducing the friction forces between the weld work pieces and the containment plates. While a lubricant (e.g., oil, synthetic lubricant, etc.) could be used to reduce the friction forces, the lubricant contaminates the weld resulting in weld defects.

SUMMARY OF THE INVENTION

Accordingly, it is an object of the present invention to provide a thermal stir welding system.

Another object of the present invention is to provide a thermal stir welding system that reduces frictional forces acting on the welding system's containment plates and stir pin.

Other objects and advantages of the present invention will become more obvious hereinafter in the specification and drawings.

In accordance with the present invention, a thermal stir welding system includes a thermal stir welding head assembly. The welding head assembly includes a first plate defining a first surface, a second plate spaced apart from the first plate and defining a second surface that opposes the first surface such that the first surface is maintained parallel to the second surface, and a rod passing perpendicularly through the first surface and second surface such that the rod is rotatable about a longitudinal axis thereof relative to the first surface and second surface. In a welding operation, the welding head assembly has a work piece disposed between the first surface and second surface with the work piece being maintained in a plastic state thereof at least in a vicinity of the rod as the rod is rotated about its longitudinal axis. Further, the welding head assembly and the work piece experience relative movement therebetween in a direction perpendicular to the longitudinal axis as the work piece is subjected to a compressive force applied by the first plate and second plate. A first source coupled to the first plate applies a first ultrasonic wave to the first plate such that the first ultrasonic wave propagates parallel to the direction of relative movement. A second source coupled to the second plate applies a second ultrasonic wave to the second plate such that the second ultrasonic wave propagates parallel to the direction of relative movement.

BRIEF DESCRIPTION OF THE DRAWING(S)

Figure 2:
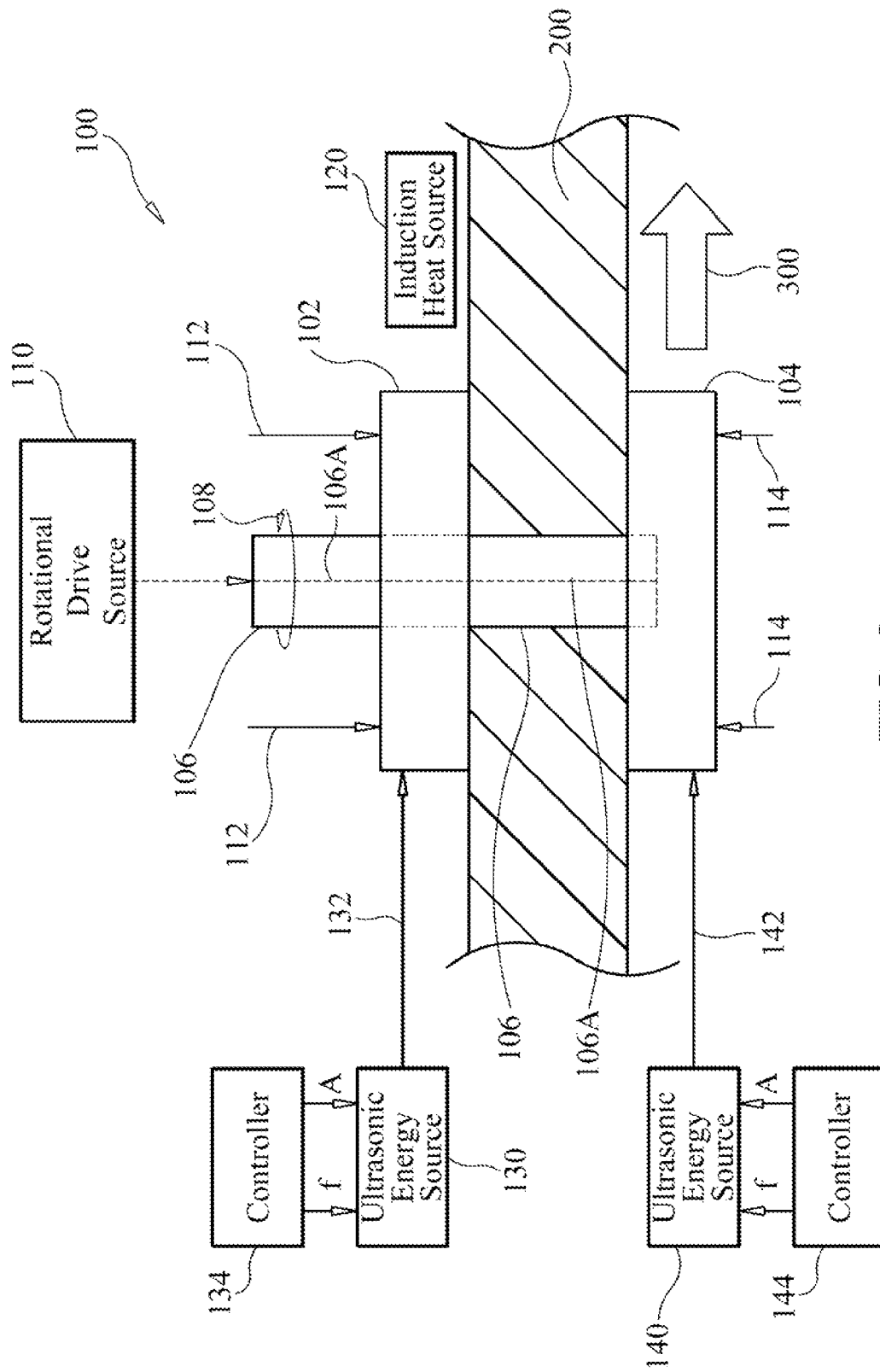

Other objects, features and advantages of the present invention will become apparent upon reference to the following description of the preferred embodiments and to the drawings, wherein corresponding reference characters indicate corresponding parts throughout the several views of the drawings and wherein:

FIG. 1 is a schematic view of metal-on-metal friction reduction using ultrasonic energy in accordance with the present invention; and FIG. 2 is a schematic view of an ultrasonically-assisted thermal stir welding system in accordance with an embodiment of the present invention.

DESCRIPTION OF THE PREFERRED EMBODIMENT(S)

Referring now to the drawings and more particularly to FIG. 1, a novel approach to metal-on-metal friction reduction utilized by the present invention is illustrated schematically. Specifically, two metal parts 10 and 12 are assumed to be in contact with one another at a contact interface 20. It is further assumed that parts 10 and 12 will experience relative movement (as indicated by arrow 30) such that parts 10 and 12 rub together at contact interface 20. For example, part 12 could be stationary while part 10 was moved on part 10. Rather than applying a lubricant to parts 10 and 12 to reduce frictional forces at contact interface 20, an ultrasonic energy source 40 applies an ultrasonic wave 42 to part 10 (or part 12) such that wave 42 will propagate through part 10 (or part 12) in a direction that is parallel to relative movement 30. The resulting longitudinal ultrasonic vibration created in part 10 (or part 12) causes lateral (i.e., perpendicular to the direction of relative movement 30) expansion and contraction in the ultrasonically-stimulated part. The lateral expansion/contraction reduces frictional forces at contact interface 20. The amplitude and frequency of ultrasonic wave 42 can be independently controlled. Testing of this friction reduction approach has shown that the frequency of ultrasonic wave 42 can range from approximately 20 KHz to approximately 100 KHz. The amplitude of ultrasonic wave 42 can be range from low power to very high power (e.g., 50 KW) without departing from the scope of the present invention of present invention.

The above-described approach to metal-on-metal friction reduction is used in the present invention to provide an ultrasonically-assisted thermal stir welding system. An embodiment of the present invention is illustrated in FIG. 2 and is referenced generally by numeral 100. Ultrasonically-assisted system 100 includes elements of a thermal stir welding system and ultrasonic friction reduction elements. With respect to the elements of a thermal stir welding system, ultrasonically-assisted system 100 includes a welding head assembly in contact with a work piece 200 to be welded. More specifically, the welding head assembly includes a first non-rotating and rigid (e.g., metal) containment plate 102, a second non-rotating and rigid (e.g., metal) containment plate 104, and a stir pin or rod 106 passing through plate 102 and supported by plate 104 (e.g., partially inserted in or passing through plate 104). Rod 106 is supported by plates 102/104 such that it can be rotated about its longitudinal axis 106A as indicated by rotational arrow 108. Rod 106 is generally made from a rigid material (e.g., metal) and is generally substantially cylindrical in shape. A rotational drive source 110 is coupled to rod 106 to both provide and control rotation 108. During a welding operation when rod 106 is rotating, compressive forces 112 and 114 are applied to plates 102 and 104, respectively, so that the region of work piece 200 between plates 102 and 104 is compressed as rod 106 rotates.

Heating of work piece 200 in the vicinity of rotating rod 106 is provided by an induction heat source 120 spaced apart from the welding head assembly. During the welding operation, the above-described welding head assembly and work piece 200 will experience relative movement as indicated by arrow 300. That is, work piece 200 is generally drawn by a pulling force aligned with relative movement arrow 300 as compressive forces 112 and 114 are applied to plates 102 and 104, respectively. Accordingly, induction heat source 120 is properly positioned based on relative movement 300 for heating the material(s) to be welded into a plastic state in the vicinity of rod 106 as would be understood by one of ordinary skill in the art.

In accordance with the present invention, each of plates 102 and 104 has an ultrasonic wave applied thereto such that the waves propagate through plates 102 and 104 in directions that are parallel to the direction of relative movement 300. In this way, each of plates 102 and 104 will experience friction reduction where contacting work piece 200 in accordance with the principles described above.

The ultrasonic waves applied to plates 102 and 104 can be different from one another in terms of frequency and/or amplitude without departing from the scope of the present invention. Accordingly, in the illustrated embodiment, an ultrasonic energy source 130 is coupled to plate 102 and a separate, independently-operated ultrasonic energy source 140 is coupled to plate 104. Source 130 applies an ultrasonic wave 132 to plate 102 while source 140 applies an ultrasonic wave to plate 104. A controller 134 can be used to control one or both of frequency (f) and amplitude (A) of ultrasonic wave 132. Similarly, a controller 144 can be used to control one or both of frequency (f) and amplitude (A) of ultrasonic wave 142. The particular construction and arrangement of controller and its corresponding ultrasonic energy source are not limitations of the present invention. For example, a source and its controller can be separate devices or integrated devices without departing from the scope of the present invention.

The advantages of the present invention are numerous. The friction reduction experienced at the thermal stir welding head will reduce stress at the welding head assembly thereby prolonging its useful life. Since friction reduction is accomplished without the use of lubricants, the ultrasonically-assisted thermal stir welding system will produce welds free of contaminants.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A thermal stir welding system, comprising:
   a thermal stir welding head assembly to include
   a first plate defining a first surface,
   a second plate spaced apart from said first plate and defining a second surface that opposes said first surface wherein said first surface is maintained parallel to said second surface, and
   a rod passing perpendicularly through said first surface and said second surface wherein said rod is rotatable about a longitudinal axis thereof relative to said first surface and said second surface,
   said welding head assembly adapted to have a work piece disposed between said first surface and said second surface with the work piece in a plastic state thereof at least in a vicinity of said rod when rotating about said longitudinal axis thereof as said welding head assembly and the work piece experience relative movement therebetween in a direction perpendicular to said longitudinal axis and as the work piece is subjected to a compressive force applied by said first plate and said second plate;
   a first source coupled to an edge of said first plate, said edge of said first plate adjoining said first surface, said first source applying a first ultrasonic wave to said edge of said first plate wherein said first ultrasonic wave propagates through said first plate and parallel to the work piece adjacent to said first surface and said direction of relative movement; and
   a second source coupled to an edge of said second plate, said edge of said second plate adjoining said second surface, said second source applying a second ultrasonic wave to said edge of said second plate wherein said second ultrasonic wave propagates through said second plate and parallel to the work piece adjacent to said second surface and said direction of relative movement, wherein friction between said welding head assembly and the work piece is reduced as said first ultrasonic wave propagates through said first plate and said second ultrasonic wave propagates through said second plate.

2. A thermal stir welding system as in claim 1, wherein said rod is substantially cylindrical.

3. A thermal stir welding system as in claim 1, wherein said rod is made from metal.

4. A thermal stir welding system as in claim 1, wherein said first source controls at least one of frequency and amplitude of said first ultrasonic wave.

5. A thermal stir welding system as in claim 1, wherein said second source controls at least one of frequency and amplitude of said second ultrasonic wave.

6. A thermal stir welding system as in claim 1, wherein said first source and said second source operate independently.

7. A thermal stir welding system as in claim 1, wherein frequency and amplitude associated with said first ultrasonic wave are different than frequency and amplitude associated with said second ultrasonic wave.

8. A thermal stir welding system as in claim 1, further comprising a heat source adapted to inductively heat the work piece to the plastic state thereof at least in the vicinity of said rod.

9. A thermal stir welding system, comprising:
   a thermal stir welding head assembly to include
   a first plate defining a first surface,
   a second plate spaced apart from said first plate and defining a second surface that opposes said first surface wherein said first surface is maintained parallel to said second surface, and
   a rod passing perpendicularly through said first surface and said second surface wherein said rod is rotatable about a longitudinal axis thereof relative to said first surface and said second surface,
   said welding head assembly adapted to have a work piece disposed between said first surface and said second surface with the work piece in a plastic state thereof at least in a vicinity of said rod when rotating about said longitudinal axis thereof as said welding head assembly and the work piece experience relative movement therebetween in a direction perpendicular to said longitudinal axis and as the work piece is subjected to a compressive force applied by said first plate and said second plate;

a heat source adapted to inductively heat the work piece to the plastic state thereof at least in the vicinity of said rod;

a first source coupled to an edge of said first plate, said edge of said first plate adjoining said first surface, said first source applying a first ultrasonic wave to said edge of said first plate wherein said first ultrasonic wave propagates through said first plate and parallel to the work piece adjacent to said first surface and said direction of relative movement; and a second source coupled to an edge of said second plate, said second source being independent of said first source, said edge of said second plate adjoining said second surface, said second source applying a second ultrasonic wave to said edge of said second plate wherein said second ultrasonic wave propagates through said second plate and parallel to the work piece adjacent to said second surface and said direction of relative movement, wherein friction between said welding head assembly and the work piece is reduced as said first ultrasonic wave propagates through said first plate and said second ultrasonic wave propagates through said second plate.

10. A thermal stir welding system as in claim 9, wherein said rod is substantially cylindrical.

11. A thermal stir welding system as in claim 9, wherein said rod is made from metal.

12. A thermal stir welding system as in claim 9, wherein said first source controls at least one of frequency and amplitude of said first ultrasonic wave.

13. A thermal stir welding system as in claim 9, wherein said second source controls at least one of frequency and amplitude of said second ultrasonic wave.

14. A thermal stir welding system as in claim 9, wherein frequency and amplitude associated with said first ultrasonic wave are different than frequency and amplitude associated with said second ultrasonic wave.

15. A thermal stir welding system, comprising:
a thermal stir welding head assembly to include
a first plate defining a first surface,
a second plate spaced apart from said first plate and defining a second surface that opposes said first surface wherein said first surface is maintained parallel to said second surface, and
a substantially-cylindrical rigid rod passing perpendicularly through said first surface and said second surface wherein said rod is rotatable about a longitudinal axis thereof relative to said first surface and said second surface, said welding head assembly adapted to have a work piece disposed between said first surface and said second surface with the work piece in a plastic state thereof at least in a vicinity of said rod when rotating about said longitudinal axis thereof as said welding head assembly and the work piece experience relative movement therebetween in a direction perpendicular to said longitudinal axis and as the work piece is subjected to a compressive force applied by said first plate and said second plate;

a rotational drive source coupled to said rod for rotating said rod about said longitudinal axis thereof;

a first source coupled to an edge of said first plate, said edge of said first plate adjoining said first surface, said first source applying a first ultrasonic wave to said edge of said first plate wherein said first ultrasonic wave propagates through said first plate and parallel to the work piece adjacent to said first surface and said direction of relative movement; and a second source coupled to an edge of said second plate, said edge of said second plate adjoining said second surface, said second source applying a second ultrasonic wave to said edge of said second plate wherein said second ultrasonic wave propagates through said second plate and parallel to the work piece adjacent to said second surface and said direction of relative movement, wherein friction between said welding head assembly and the work piece is reduced as said first ultrasonic wave propagates through said first plate and said second ultrasonic wave propagates through said second plate.

16. A thermal stir welding system as in claim 15, wherein said first source controls at least one of frequency and amplitude of said first ultrasonic wave.

17. A thermal stir welding system as in claim 15, wherein said second source controls at least one of frequency and amplitude of said second ultrasonic wave.

18. A thermal stir welding system as in claim 15, wherein said first source and said second source operate independently.

19. A thermal stir welding system as in claim 15, wherein frequency and amplitude associated with said first ultrasonic wave are different than frequency and amplitude associated with said second ultrasonic wave.

20. A thermal stir welding system as in claim 15, further comprising a heat source adapted to inductively heat the work piece to the plastic state thereof at least in the vicinity of said rod.

* * * * *